(12) United States Patent
Lu et al.

(10) Patent No.: US 12,376,148 B2
(45) Date of Patent: Jul. 29, 2025

(54) EDCA SCHEMES FOR TRIGGERED TXOP SHARING OPERATIONS

(71) Applicant: MediaTek Singapore Pte. Ltd., Singapore (SG)

(72) Inventors: Kai Ying Lu, San Jose, CA (US); James Chih-Shi Yee, San Jose, CA (US); Yongho Seok, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 452 days.

(21) Appl. No.: 17/730,726

(22) Filed: Apr. 27, 2022

(65) Prior Publication Data
US 2022/0353910 A1    Nov. 3, 2022

Related U.S. Application Data

(60) Provisional application No. 63/183,085, filed on May 3, 2021.

(51) Int. Cl.
*H04W 74/0808* (2024.01)
(52) U.S. Cl.
CPC .............. *H04W 74/0808* (2013.01)
(58) Field of Classification Search
CPC ................................. H04W 74/0808
See application file for complete search history.

(56) References Cited

U.S. PATENT DOCUMENTS

| 10,412,677 | B2* | 9/2019 | Choi | H04W 52/0238 |
| 2009/0154393 | A1* | 6/2009 | Hsu | H04W 74/0816 |
| | | | | 370/328 |
| 2009/0279427 | A1* | 11/2009 | Ji | H04W 74/0816 |
| | | | | 370/230 |
| 2012/0008490 | A1* | 1/2012 | Zhu | H04W 72/56 |
| | | | | 370/216 |
| 2016/0157266 | A1* | 6/2016 | Wang | H04W 72/23 |
| | | | | 370/336 |
| 2016/0345362 | A1* | 11/2016 | Lee | H04W 74/0816 |
| 2019/0230709 | A1* | 7/2019 | Li | H04W 74/0833 |
| 2019/0306837 | A1 | 10/2019 | Choi et al. | |
| 2021/0127307 | A1* | 4/2021 | Huang | H04W 16/18 |
| 2021/0168712 | A1* | 6/2021 | Cherian | H04W 72/27 |
| 2022/0007417 | A1* | 1/2022 | Xin | H04W 74/085 |
| 2022/0053560 | A1* | 2/2022 | Xin | H04W 28/0268 |
| 2022/0159715 | A1* | 5/2022 | Kim | H04W 74/08 |

(Continued)

FOREIGN PATENT DOCUMENTS

| CN | 108476518 A | 8/2018 |
| WO | WO 2017074025 A1 | 5/2017 |

OTHER PUBLICATIONS

Taiwan Intellectual Property Office, Office Action for Taiwan Patent Application No. 111116381, Dec. 13, 2022.

(Continued)

*Primary Examiner* — Melanie Jagannathan
(74) *Attorney, Agent, or Firm* — Andy M. Han; Han IP PLLC (57) ABSTRACT

A station (STA) associated with an access point (AP) receives, from the AP, an indication of an enhanced distributed channel access (EDCA) parameter set. The STA then updates one or more parameters of the EDCA parameter set with respect to a triggered transmission opportunity (TXOP) sharing (TXS) operation.

18 Claims, 6 Drawing Sheets

(56) References Cited

U.S. PATENT DOCUMENTS

| | | | |
|---|---|---|---|
| 2022/0240264 A1* | 7/2022 | Chu | H04W 12/08 |
| 2022/0248423 A1* | 8/2022 | Monajemi | H04W 74/04 |
| 2022/0322438 A1* | 10/2022 | Xin | H04W 74/085 |
| 2022/0322460 A1* | 10/2022 | Xin | H04W 74/0866 |
| 2024/0040621 A1* | 2/2024 | Le Houerou | H04W 72/0446 |
| 2024/0049304 A1* | 2/2024 | Ko | H04W 74/0816 |
| 2024/0188129 A1* | 6/2024 | Ciochina-Kar | H04W 72/541 |

OTHER PUBLICATIONS

IEEE 802.11-17/172Irl, IEEE P802.11, Wireless LANs, Normative Text for Deterministic Backoff.

IEEE 802.11-19/1275r0, IEEE P802.11, Wireless LANs, Proposed Resolution to Tgax D4.0, CR20268.

China National Intellectual Property Administration, First Office Action in China Patent Application No. 202210471223.0, May 16, 2024.

IEEE, "Draft Standard for Informatino technology—Telecommunications and informatin exchange between system Local and metropolitan area networks—Specificatino requirements", 802.11 Working Group, IEEE P802.11ax/D8.0, Oct. 2020.

European Patent Office, European Search Report for European Patent Application No. 22170756.5, Sep. 6, 2022.

Laurent Cariou et al. "Proposed text changes for MU EDCA parameters", Sep. 13, 2016, XP055429095, IEEE 802.11 Mentor Public Documentation Portal Retrieved from https://mentor.ieee.org/802.11/dcn/16/11-16-1180-01-00ax-proposed-text-changes-for-mu-edca-parameters.docx.

Dibakar Das (Intel): "PDT channel access Triggered SU", IEEE Draft; 11-21-0268-00-00BE-PDT-Channel—Access-Triggered-SU, IEEE-SA Mentor, Piscataway, NJ USA, vol. 802.11 EHT; 802.11be Mar. 20, 2021, pp. 1-5, XP068179368, https:mentor.ieee.org/802.11/dcn/21/11-21-0268-00-00be-pdt-channel-access-triggered-su.docx.

* cited by examiner

EDCA SCHEMES FOR TRIGGERED TXOP SHARING OPERATIONS

CROSS REFERENCE TO RELATED PATENT APPLICATION

The present disclosure is part of a non-provisional patent application claiming the priority benefit of U.S. Provisional Patent Application No. 63/183,085, filed 3 May 2021, the content of which being incorporated by reference in its entirety.

TECHNICAL FIELD

The present disclosure is generally related to wireless communications and, more particularly, to enhanced distributed channel access (EDCA) schemes for triggered transmission opportunity (TXOP) sharing operations in wireless communications.

BACKGROUND

Unless otherwise indicated herein, approaches described in this section are not prior art to the claims listed below and are not admitted as prior art by inclusion in this section.

In wireless networks such as a wireless local area network (WLAN) operating in accordance with the Institute of Electrical and Electronics Engineers (IEEE) 802.11 standard(s), when there are a large number of associated non-access point (non-AP) stations (STAs) in the same basic service set (BSS), a channel access contention mechanism might not be efficient and, as a result, quality of service (QoS) requirement(s) might not be satisfied due to channel contention collision(s) between STAs attempting to access the medium or channel. An access point (AP) should have better control over the medium especially in high-load scenarios. A triggered TXOP sharing (TXS) procedure may allow an AP to allocate a portion of time within a TXOP obtained by the AP to one or more non-AP STAs for transmitting one or more non-trigger-based (non-TB) physical-layer protocol data units (PPDUs) to either the associated AP or other peer non-AP STA(s). However, how to achieve better control over the medium so that the AP can have more chances to share the obtained TXOP and allocate resources to its associated STAs is one issue to be resolved. Moreover, how the AP is to ensure fairness among legacy and extremely-high-throughput (EHT) non-AP STAs when the TXOP sharing can only happen among STAs capable of triggered TXOP sharing is another issue to be resolved. Therefore, there is a need for a solution of EDCA schemes for triggered TXOP sharing operations in wireless communications to address aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EDCA schemes for triggered TXOP sharing operations in wireless communications. Under various proposed schemes in accordance with the present disclosure, it is believed that aforementioned issues may be addressed or otherwise alleviated.

In one aspect, a method may involve a STA associated with an AP receiving, from the AP, an indication of an EDCA parameter set. The method may also involve the STA updating one or more parameters of the EDCA parameter set with respect to a TXS operation.

In another aspect, an apparatus may include a transceiver and a processor coupled to the transceiver. The transceiver may be configured to wirelessly communicate with an AP. The processor may be configured to receive, from the AP, an indication of an EDCA parameter set. The processor may also be configured to update one or more parameters of the EDCA parameter set with respect to a TXS operation.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, 5th Generation (5 G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EDCA schemes for triggered TXOP sharing operations in wireless communications. According to the present disclosure, a number of possible solutions may be implemented separately or jointly. That is, although these possible solutions may be described below separately, two or more of these possible solutions may be implemented in one combination or another.

Figure 1:
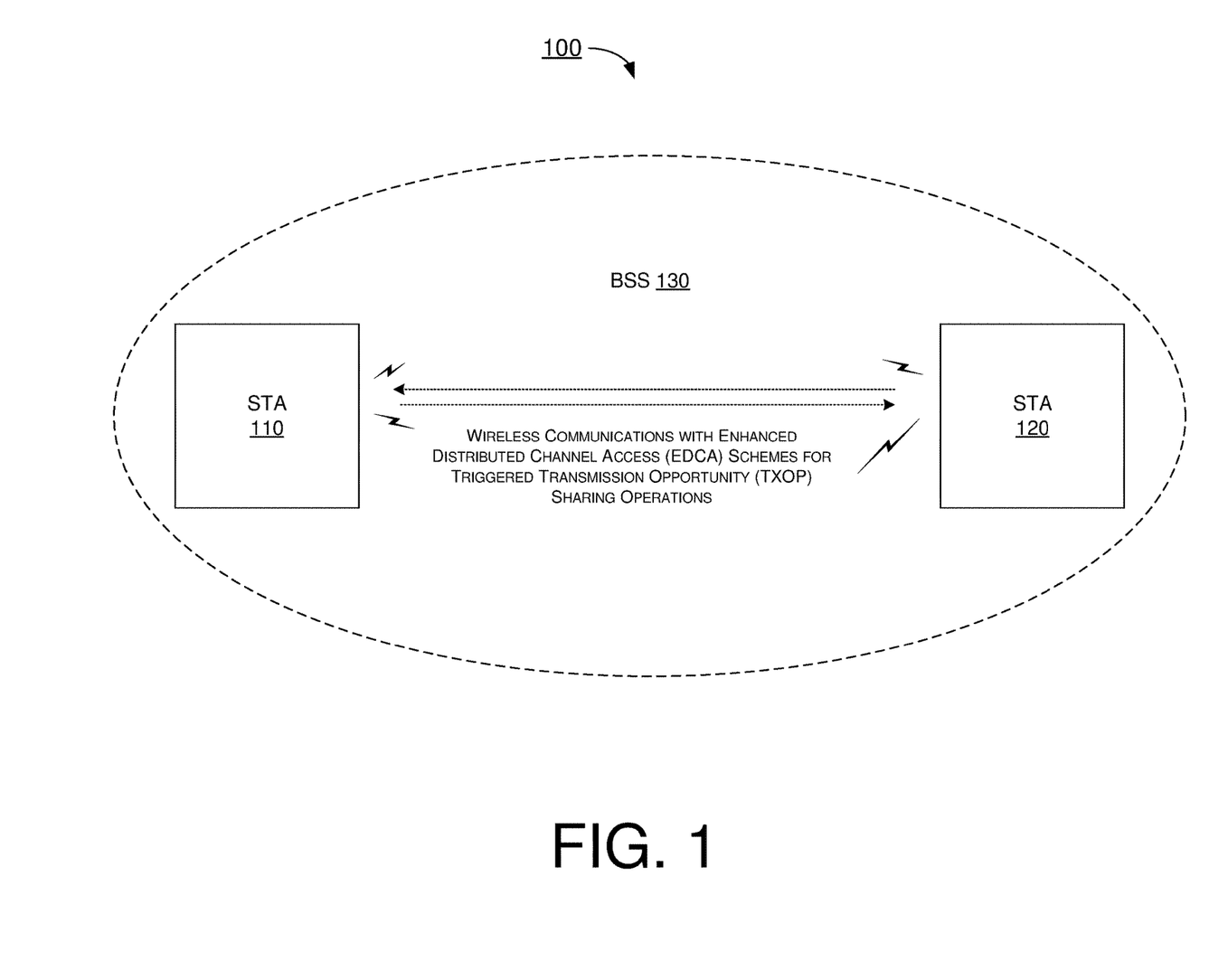
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6. Referring to FIG. 1, network environment 100 may involve at least a first STA (or STA 110) and a second STA (or STA 120) communicating wirelessly with each other in a BSS 130 in accordance with one or more IEEE 802.11 standards (e.g., IEEE 802.11be and beyond). Each of STA 110 and STA 120 may function as either an AP STA or a non-AP STA. Each of STA 110 and STA 120 may be configured to utilize EDCA schemes for triggered TXOP sharing operations in wireless communications in accordance with various proposed schemes, as described below.

Under various proposed schemes in accordance with the present disclosure, an AP (e.g., STA 110 functioning as an AP STA) may indicate a TXS EDCA (also known as multi-user (MU) EDCA) parameter set which is used to control the use of EDCA for channel contention by non-AP STAs (including STA 120 functioning as a non-AP STA) following a particular TXS operation. It is noteworthy that, among a number of access categories (ACs), each AC may be associated with a respective EDCA parameter set corresponding to a respective priority level of different priorities with respect to EDCA. The TXS EDCA parameter set (based on which a non-AP STA performs EDCA to access the medium) may include, for example and without limitation, the following parameter records: (i) TXS AC_BE parameter record (pertaining to the "best effort" access category), (ii) TXS AC_BK parameter record (pertaining to the "background" access category), (iii) TXS AC_VO parameter record (pertaining to the "voice" access category), and (iv) TXS AC_VI parameter record (pertaining to the "video" access category). Each parameter record may include at least the following information: (i) contention window (CW) parameters CWmin (minimum CW) and CWmax (maximum CW), (ii) a TXS EDCA Timer, and (iii) an arbitration interframe spacing number (AIFSN). For a higher-priority AC or traffic, the CW size may be smaller so that the respective STA may have a shorter backoff before attempting to access the medium/channel again. During the duration of the TXS EDCA Timer, a STA (e.g., STA 120) may use, implement or otherwise apply the TXS EDCA parameters for a corresponding access category (AC), except that the value 0 is reserved. The AIFSN may denote the number of slots after a short interframe space (SIFS) that the STA defers before either invoking a backoff procedure or starting a transmission, except that the value 0 may indicate that EDCA is disabled for the duration specified by the TXS EDCA Timer for the corresponding AC. That is, after a STA has utilized TXOP sharing during a TXS service period (SP), the TXS EDCA Timer may be used to set a duration during which that STA is to use, implement or otherwise apply the updated TXS EDCA parameter set (which has a lower priority than that of a regular MU EDCA parameter set) for fairness. Under various proposed schemes, an AP (e.g., STA 110) may change the TXS EDCA parameters by including a TXS EDCA Parameter Set element with updated TXS EDCA parameters in the Beacon frames and Probe Response frames transmitted by the AP.

Figure 2:
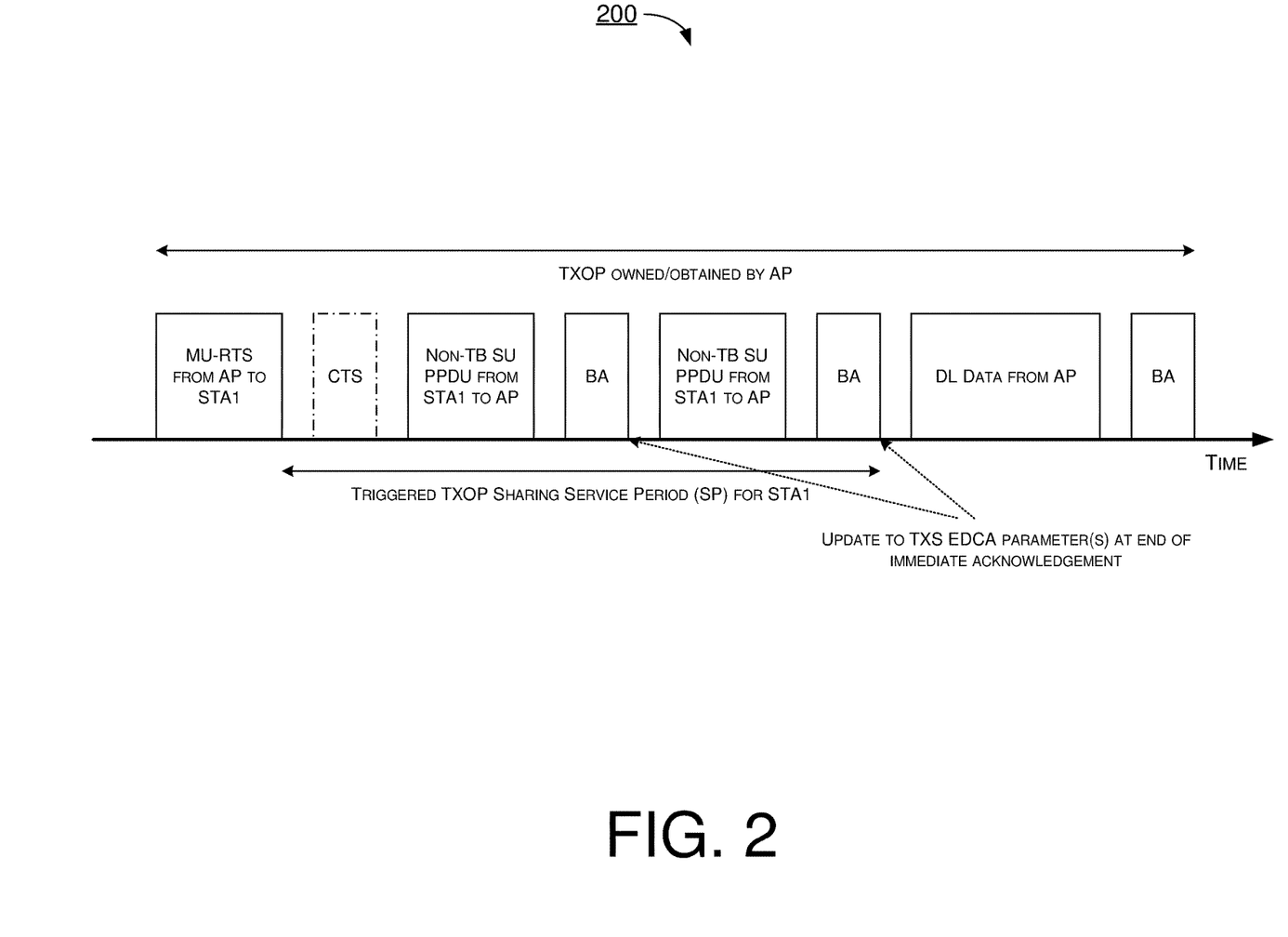
FIG. 2 is a diagram of an example scenario in accordance with the present disclosure.

FIG. 2 illustrates an example scenario 200 of EDCA parameters for TXS operation under a proposed scheme in accordance with the present disclosure. Under the proposed scheme, a non-AP STA (e.g., STA 120) that receives a multi-user request-to-send (MU-RTS) TXS Trigger frame from its associated AP (e.g., STA 110) and that contains a User Information field that is addressed to it (e.g., STA 120) may update its AC-specific CWmin[AC], CWmax[AC], AIFSN[AC] and TXS EDCA Timer[AC] state variables corresponding to the TXS EDCA parameter set for all the ACs from which at least one QoS Data frame was transmitted successfully within the allocated time in response to a transmitted MU-RTS TXS Trigger frame from the associated AP. Under the proposed scheme, a QoS Data frame may be transmitted successfully by the STA in a non-TB PPDU for an AC in an event that it requires immediate acknowledgement and that the STA receives an immediate acknowledgement for that data frame, or in an event that the QoS Data frame does not require immediate acknowledgement. Referring to FIG. 2, the STA may update one or more current EDCA parameter(s) to the TXS EDCA parameter(s) at the end of an immediate acknowledgement (e.g., block acknowledgement (BA)) and use, implement or otherwise apply the updated TXS EDCA parameter(s) in order to access the medium/channel using EDCA channel access scheme to obtain the medium outside the TXS operation. At other times outside the TXS operation, the priority may be lower by using the TXS EDCA parameters for an EHT non-AP STA with a non-zero value TXS EDCA timer so that other legacy non-AP STA or EHT non-AP STA with a zero value TXS EDCA timer may have a chance to access the medium/channel.

Figure 3:
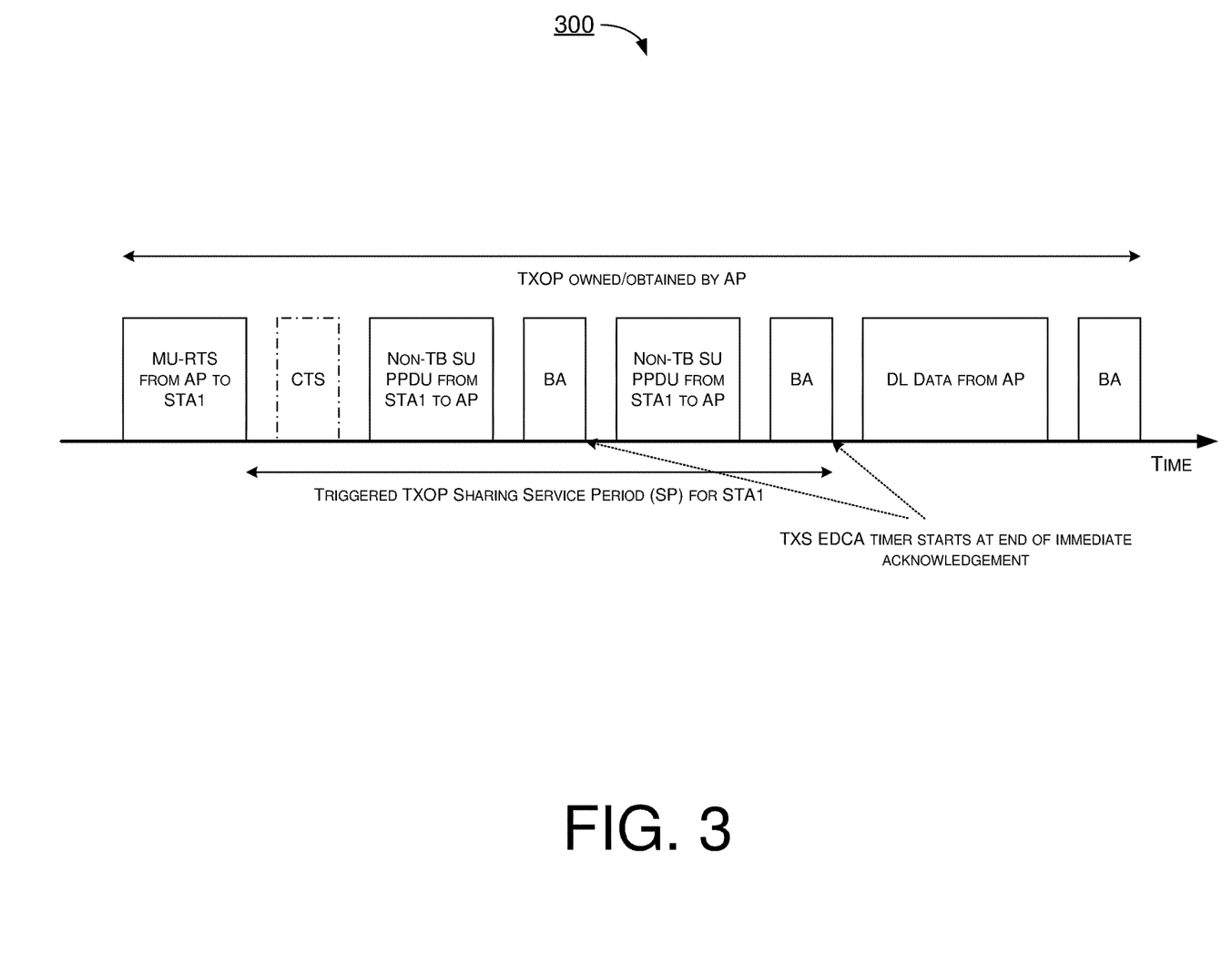
FIG. 3 is a diagram of an example scenario in accordance with the present disclosure.

FIG. 3 illustrates an example scenario 300 of EDCA parameters for TXS operation under a proposed scheme in accordance with the present disclosure. Under the proposed scheme, usage, implementation or application (by a STA) of the updated TXS EDCA Timer[AC] may start at the end of the immediate acknowledgement/response in case that the transmitted non-TB PPDU contains at least one QoS Data frame for that AC that requires immediate acknowledgement. Alternatively, usage, implementation or application (by the STA) of the updated TXS EDCA Timer[AC] may start at the end of the non-TB PPDU in case that the transmitted non-TB PPDU does not contain any QoS Data frame for that AC that requires immediate acknowledgement. Still alternatively, usage, implementation or application (by the STA) of the updated TXS EDCA Timer[AC] may start at the end of a negotiated allocated time.

Figure 4:
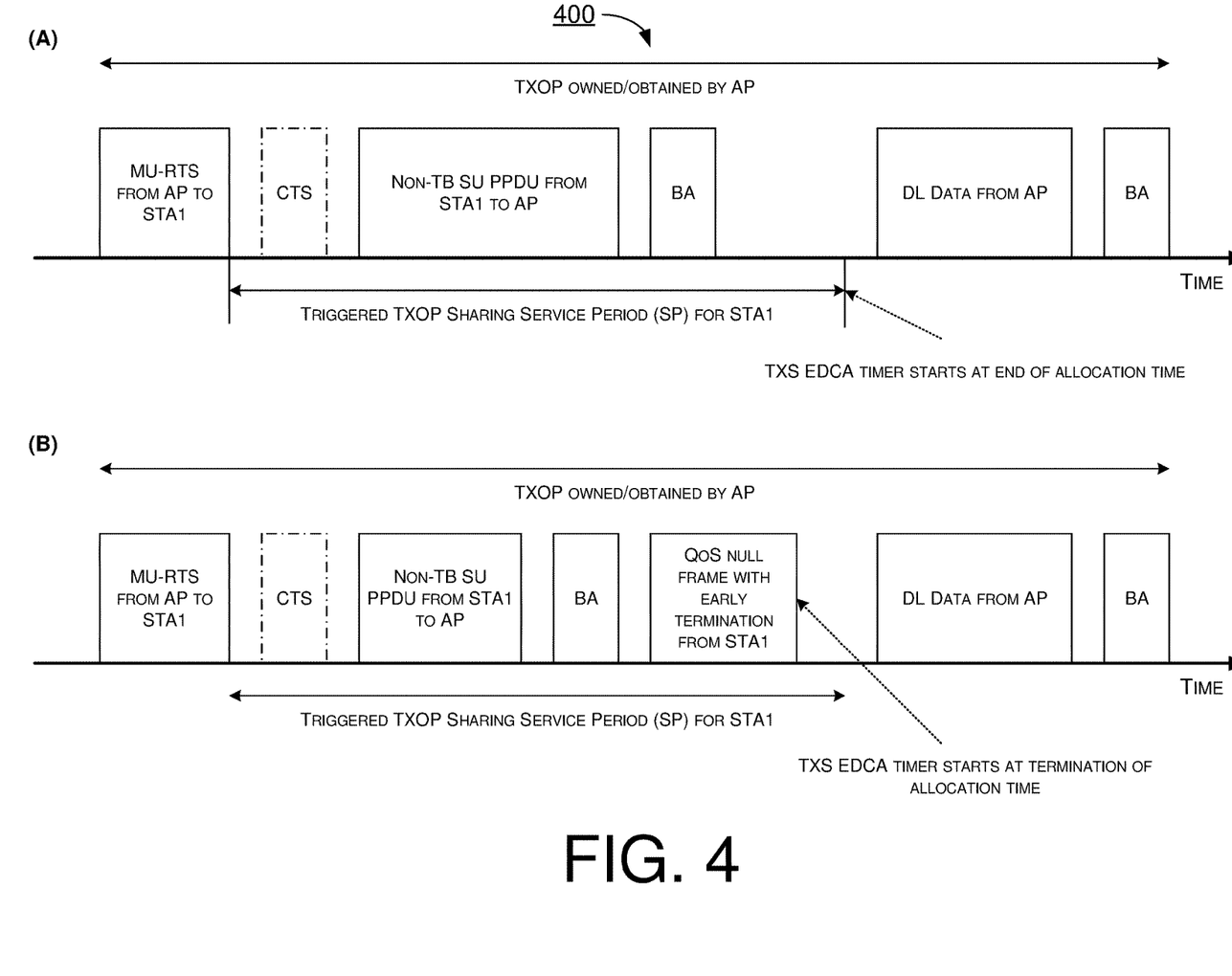
FIG. 4 is a diagram of an example scenario in accordance with the present disclosure.

FIG. 4 illustrates an example scenario 400 of EDCA parameters for TXS operation under a proposed scheme in accordance with the present disclosure. Referring to part (A) of FIG. 4, under the proposed scheme, implementation or application (by a STA) of the updated TXS EDCA Timer [AC] may start at the end of the allocated time. Referring to part (B) of FIG. 4, alternatively, implementation or application (by the STA) of the updated TXS EDCA Timer[AC] may start at the termination of the TXOP sharing. The non-AP STA may terminate the sharing earlier than the end of the allocated time.

Under a proposed scheme in accordance with the present disclosure, the allocated time in the Triggered TXOP sharing may be indicated or negotiated between the non-AP STA and its associated AP. The AP may signal the allocated time in a MU-RTS TXS trigger frame. The STA addressed by the MU-RTS TXS trigger frame may indicate its acceptance, rejection or negotiation of the allocated time. In a first option (Option-1), the duration field of the clear-to-send (CTS) frame in response to the MU-RTS TXS trigger frame may contain the value indicating the allocation time required by the STA. For instance, a value of 0 or a predefined non-zero value may indicate rejection of the allocated time by the STA. Alternatively, or additionally, a value greater than 0 and less than or equal to the allocated time carried in the MU-RTS TXS trigger frame may indicate the required allocation time (as required by the STA and being negotiated with the AP). In a second option (Option-2), a non-TB single-user (SU) PPDU transmitted by the STA may carry the required allocation time. For instance, the required allocation time may be carried in the TXOP duration field of a signal A (SIG-A) field of the non-TB PPDU. Alternatively, the required allocation time may be carried in the duration field of a medium access control (MAC) header of the non-TB PPDU. The value of the required allocation time indicates a time no later than an ending time of the PPDU carrying the MU-RTS TXS trigger frame plus the required allocation time in soliciting the MU-RTS TXS trigger frame.

Under a proposed scheme in accordance with the present disclosure, with respect to non-AP STA behavior in a TXS operation, after receiving an MU-RTS TXS Trigger frame from its associated AP addressed to a non-AP STA, the non-AP STA may perform certain operations. For instance, the non-AP STA may transmit one or more non-TB PPDUs within the time allocation indicated or negotiated with the associated AP. The first PPDU of the exchange may be a CTS frame transmitted per rule(s) in response to the MU-RTS, except that: (i) the STA may not respond with the CTS in case that it rejects the allocated time, or (ii) the STA may set the duration field of the CTS to 0 or a predefined non-zero value to reject the allocated time. If the STA rejected the TXOP sharing by setting the duration field of the CTS to 0 or a predefined non-zero value, the associated AP may continue to share the TXOP to other STAs or perform frame exchanges within the obtained TXOP. Under the proposed scheme, the time allocation may start when the PHY-RXEND.indication primitive of the PPDU that contains the MU-RTS TXS Trigger frame has occurred in an event that the non-AP STA accepted the TXOP sharing.

Illustrative Implementations

Figure 5:
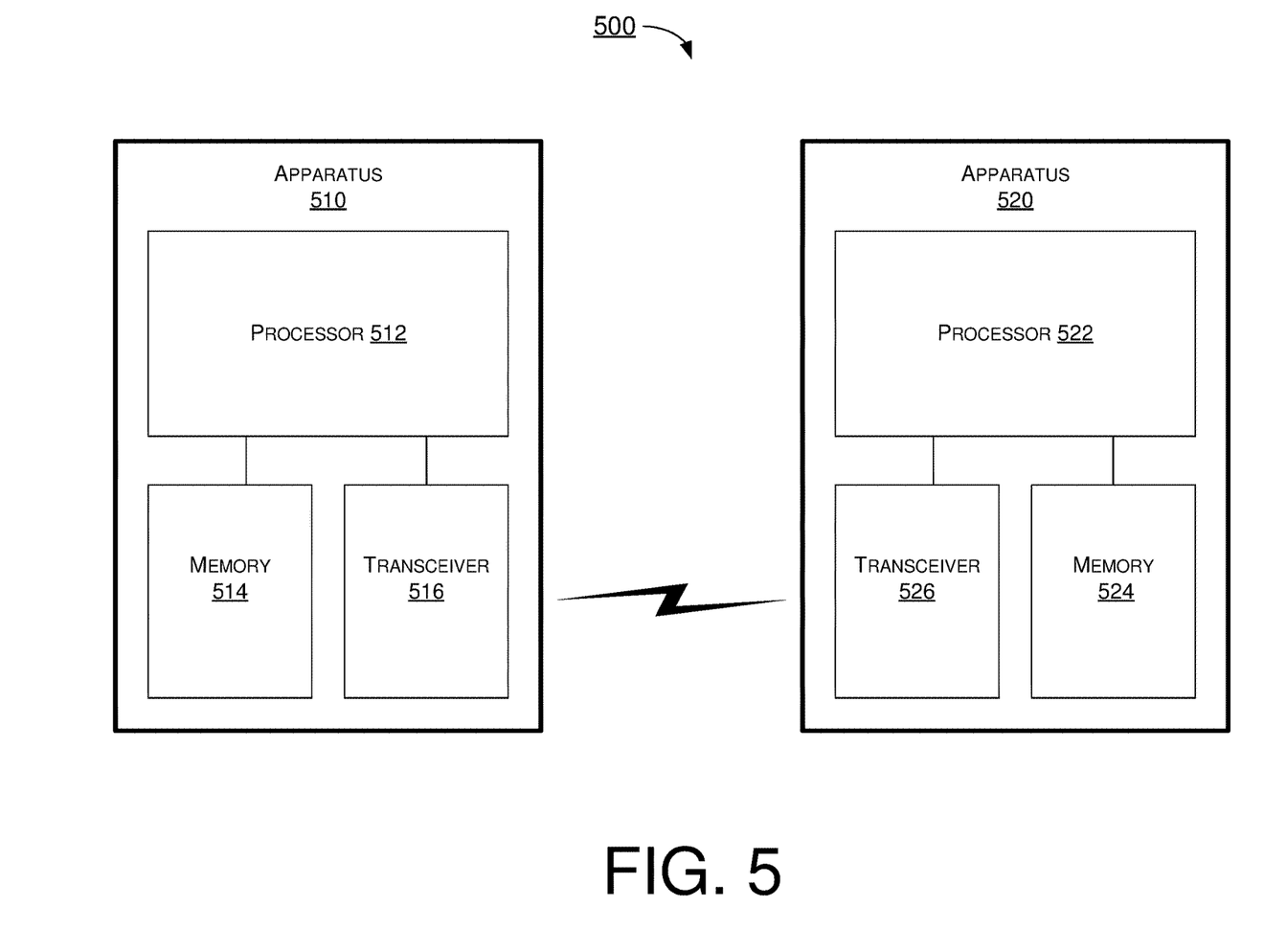
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to EDCA schemes for triggered TXOP sharing operations in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP MLD in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP MLD or an AP MLD. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, processor 512 and processor 522 may include multiple processors in some implementations and a single processor in other implementations in accordance with the present disclosure. In another aspect, processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 512 and processor 522 is a special-purpose machine specifically designed, arranged and configured to perform specific tasks including those pertaining to EDCA schemes for triggered TXOP sharing operations in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as MLD 110 (e.g., a non-AP MLD operating on a NSTR link pair), and apparatus 520, as MLD 120 (e.g., an AP MLD), is provided below. It is noteworthy that, although the example implementations described below are provided in the context of WLAN, the same may be implemented in other types of networks. It is also noteworthy that, although examples described below are provide in the context of apparatus 510, the examples may also be applicable to apparatus 520 or otherwise implemented by apparatus 520.

Under a proposed scheme pertaining to EDCA schemes for triggered TXOP sharing operations in wireless communications in accordance with the present disclosure, with apparatus 510 implemented in a non-AP STA (e.g., STA 110) and apparatus 520 implemented in an AP STA (e.g., STA 120), processor 512 may receive, via transceiver 516, an indication of an EDCA parameter set from apparatus 520. Additionally, processor 512 may update one or more parameters of the EDCA parameter set with respect to a TXS operation.

In some implementations, the EDCA parameter set may include a plurality of AC-related parameter records including: (i) a TXS AC_BE parameter record pertaining to a best-effort AC; (ii) a TXS AC_BK parameter record pertaining to a background AC; (iii) a TXS AC_VO parameter record pertaining to a voice AC; and (iv) a TXS AC_VI parameter record pertaining to a video AC.

In some implementations, each of the plurality of AC-related parameter records may include a plurality of parameters including: (a) a minimum CW parameter; (b) a maximum CW parameter; (c) a TXS EDCA timer; and (d) an AIFSN. In some implementations, processor 512 may apply the plurality of parameters for a corresponding AC when the TXS EDCA timer is non-zero. Moreover, the AIFSN may denote a number of slots after a SIFS that the STA defers before invoking a backoff procedure or starting a transmission.

In some implementations, in updating the one or more parameters of the EDCA parameter set, processor 512 may start the TXS EDCA timer at an end of an immediate acknowledgement in response to transmission of a frame by apparatus 510 or at an end of the transmission of the frame which does not require the immediate acknowledgement by apparatus 510 within an allocated time.

In some implementations, in receiving the indication, processor 512 may receive the indication in a beacon frame or a probe response frame.

In some implementations, processor 512 may also perform other operations. For instance, processor 512 may perform, during a TXS SP, a TXS operation. The TXS operation may involve: (i) receiving, via transceiver 516, from apparatus 520 an MU-RTS TXS trigger frame indicating an allocated time for performing the TXS operation; and (ii) transmitting, via transceiver 516, a PPDU (e.g., non-TB PPDU) after sending a CTS frame responsive to receiving the MU-RTS TXS trigger frame.

In some implementations, responsive to the MU-RTS TXS trigger frame containing a user information field that is addressed to the STA, in updating the one or more parameters of the EDCA parameter set, processor 512 may update the one or more parameters corresponding to one or more ACs from which at least one QoS data frame was transmitted successfully by apparatus 510 within an allocated time in response to the MU-RTS TXS trigger frame.

In some implementations, in updating the one or more parameters of the EDCA parameter set, processor 512 may apply the updated one or more parameters and starting an updated TXS EDCA timer at an end of the acknowledgement. Alternatively, in updating the one or more parameters of the EDCA parameter set, processor 512 may apply the updated one or more parameters and starting an updated TXS EDCA timer at an end of the transmitting of the PPDU when the PPDU does not require an immediate response. Still alternatively, in updating the one or more parameters of the EDCA parameter set, processor 512 may apply the updated one or more parameters and starting an updated TXS EDCA timer at an end of a negotiated allocated time.

In some implementations, processor 512 may also indicate, via transceiver 516, a required allocation time responsive to receiving the MU-RTS TXS trigger frame.

In some implementations, responsive to the MU-RTS TXS trigger frame containing a value indicating the allocated time, in indicating, processor 512 may transmit a CTS frame containing a duration field that indicates the required allocation time. In some implementations, a value of 0 or a predefined value in the duration field may indicate the required allocation time. Moreover, a value greater than 0 and less than or equal to the allocated time in the duration field may indicate the negotiation of a required allocation time different than the allocated time.

In some implementations, in indicating, processor 512 may indicate, in the PPDU, a required allocation time. In such cases, a value of the required allocation time may indicate a time no later than an ending time of the PPDU carrying the MU-RTS TXS trigger frame plus the required allocation time in soliciting the MU-RTS TXS trigger frame. In some implementations, a value of the required allocation time may be carried in a TXOP duration field of a SIG-A field of the PPDU or in a duration field of a MAC header of the PPDU.

Illustrative Processes

Figure 6:
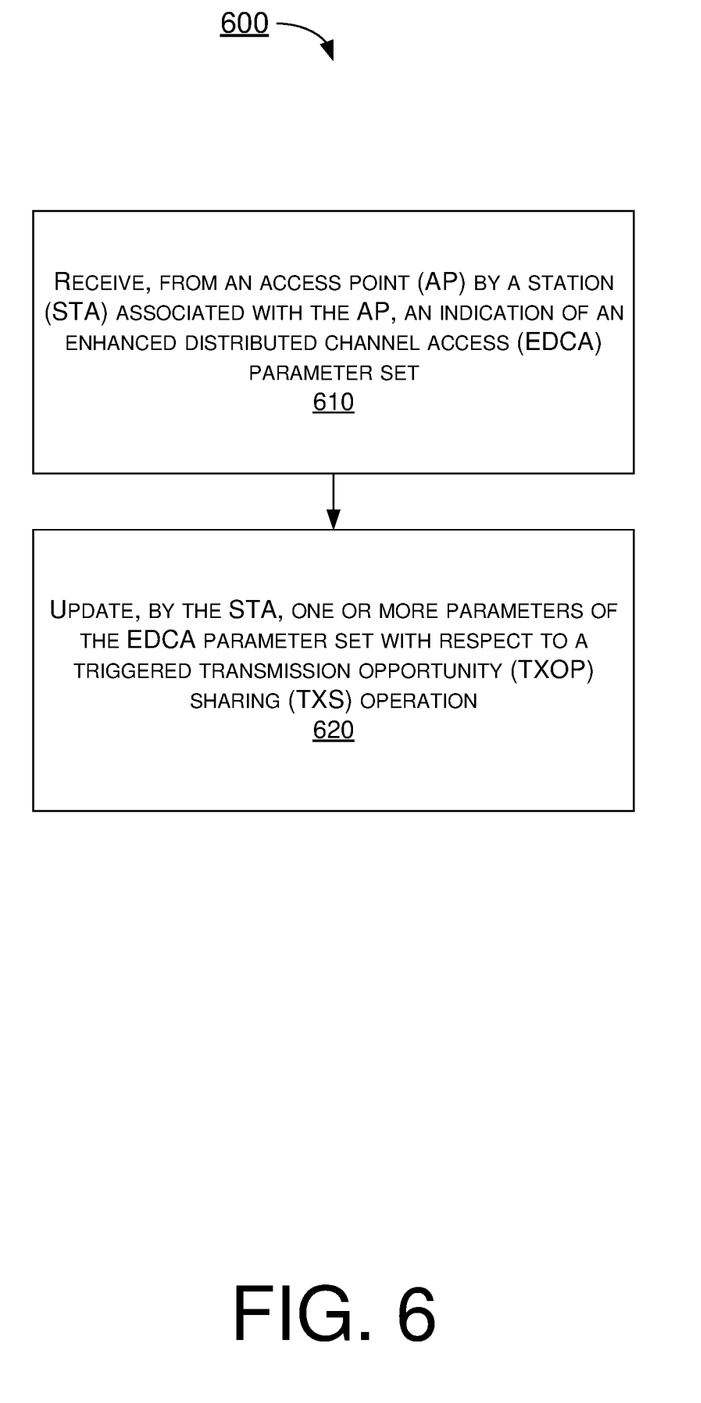
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to EDCA schemes for triggered TXOP sharing operations in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as MLD 110 and apparatus 520 implemented in or as MLD 120 of a wireless network such as a WLAN in network environment 100 in accordance with one or more of IEEE 802.11 standards. It is noteworthy that, although examples described below are provide in the context of apparatus 510 implemented in a non-AP STA (e.g., STA 110) and apparatus 520 implemented in an AP STA (e.g., STA 120). Process 600 may begin at block 610.

At 610, process 600 may involve processor 512 receiving, via transceiver 516, an indication of an EDCA parameter set from apparatus 520. Process 600 may proceed from 610 to 620.

At 620, process 600 may involve processor 512 updating one or more parameters of the EDCA parameter set with respect to a TXS operation.

In some implementations, the EDCA parameter set may include a plurality of AC-related parameter records including: (i) a TXS AC_BE parameter record pertaining to a best-effort AC; (ii) a TXS AC_BK parameter record pertaining to a background AC; (iii) a TXS AC_VO parameter record pertaining to a voice AC; and (iv) a TXS AC_VI parameter record pertaining to a video AC.

In some implementations, each of the plurality of AC-related parameter records may include a plurality of parameters including: (a) a minimum CW parameter; (b) a maximum CW parameter; (c) a TXS EDCA timer; and (d) an AIFSN. In some implementations, processor 512 may apply the plurality of parameters for a corresponding AC when the TXS EDCA timer is non-zero. Moreover, the AIFSN may denote a number of slots after a SIFS that the STA defers before invoking a backoff procedure or starting a transmission.

In some implementations, in updating the one or more parameters of the EDCA parameter set, process 600 may involve processor 512 starting the TXS EDCA timer at an end of an immediate acknowledgement in response to transmission of a frame by apparatus 510 or at an end of the transmission of the frame which does not require the immediate acknowledgement by apparatus 510 within an allocated time.

In some implementations, in receiving the indication, process 600 may involve processor 512 receiving the indication in a beacon frame or a probe response frame.

In some implementations, process 600 may further involve processor 512 performing other operations. For instance, process 600 may involve processor 512 performing, during a TXS SP, a TXS operation. The TXS operation may involve: (i) receiving, via transceiver 516, from apparatus 520 an MU-RTS TXS trigger frame indicating an allocated time for performing the TXS operation; and (ii) transmitting, via transceiver 516, a PPDU (e.g., non-TB PPDU) after sending a CTS frame responsive to receiving the MU-RTS TXS trigger frame.

In some implementations, responsive to the MU-RTS TXS trigger frame containing a user information field that is addressed to the STA, in updating the one or more parameters of the EDCA parameter set, process 600 may involve processor 512 updating the one or more parameters corresponding to one or more ACs from which at least one QoS data frame was transmitted successfully by apparatus 510 within an allocated time in response to the MU-RTS TXS trigger frame.

In some implementations, in updating the one or more parameters of the EDCA parameter set, process 600 may also involve processor 512 applying the updated one or more parameters and starting an updated TXS EDCA timer at an end of the acknowledgement. Alternatively, in updating the one or more parameters of the EDCA parameter set, process 600 may also involve processor 512 applying the updated one or more parameters and starting an updated TXS EDCA timer at an end of the transmitting of the PPDU when the PPDU does not require an immediate response. Still alternatively, in updating the one or more parameters of the EDCA parameter set, process 600 may also involve processor 512 applying the updated one or more parameters and starting an updated TXS EDCA timer at an end of a negotiated allocated time.

In some implementations, process 600 may further involve processor 512 indicating, via transceiver 516, a required allocation time responsive to receiving the MU-RTS TXS trigger frame.

In some implementations, responsive to the MU-RTS TXS trigger frame containing a value indicating the allocated time, in indicating, process 600 may involve processor 512 transmitting a CTS frame containing a duration field that indicates the required allocation time. In some implementations, a value of 0 or a predefined value in the duration field may indicate the required allocation time. Moreover, a value greater than 0 and less than or equal to the allocated time in the duration field may indicate the negotiation of a required allocation time different than the allocated time.

In some implementations, in indicating, process 600 may involve processor 512 indicating, in the PPDU, a required allocation time. In such cases, a value of the required allocation time may indicate a time no later than an ending time of the PPDU carrying the MU-RTS TXS trigger frame plus the required allocation time in soliciting the MU-RTS TXS trigger frame. In some implementations, a value of the required allocation time may be carried in a TXOP duration field of a SIG-A field of the PPDU or in a duration field of a MAC header of the PPDU.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising: receiving, from an access point (AP) by a station (STA) associated with the AP, an indication of an enhanced distributed channel access (EDCA) parameter set; and updating, by the STA, one or more parameters of the EDCA parameter set with respect to a triggered transmission opportunity (TXOP) sharing (TXS) operation, wherein the EDCA parameter set comprises a plurality of access category (AC)-related parameter records, wherein each of the plurality of AC-related parameter records comprises a TXS EDCA timer, wherein the STA applies the plurality of parameters for a corresponding AC when the TXS EDCA timer is non-zero, and wherein an arbitration interframe spacing number (AIFSN) denotes a number of slots after a short interframe space (SIFS) that the STA defers before invoking a backoff procedure or starting a transmission, wherein the updating of the one or more parameters of the EDCA parameter set comprises starting the TXS EDCA timer at an end of an immediate acknowledgement in response to transmission of a frame by the STA or at an end of the transmission of the frame which does not require the immediate acknowledgement by the STA within an allocated time.

2. The method of claim 1, wherein the plurality of access category (AC)-related parameter records comprises:
   a TXS AC_BE parameter record pertaining to a best-effort AC;
   a TXS AC_BK parameter record pertaining to a background AC;
   a TXS AC_VO parameter record pertaining to a voice AC; and
   a TXS AC_VI parameter record pertaining to a video AC.

3. The method of claim 2, wherein each of the plurality of AC-related parameter records further comprises a plurality of parameters comprising: a minimum contention window (CW) parameter; a maximum CW parameter; and a TXS EDCA timer; and an AIFSN.

4. The method of claim 1, wherein the receiving of the indication comprises receiving the indication in a beacon frame or a probe response frame.

5. The method of claim 1, further comprising:
   performing, by the STA during a TXS service period (SP), a TXS operation comprising:
      receiving, from the AP by the STA, a multi-user (MU) request-to-send (RTS) TXS trigger frame indicating an allocated time for performing the TXS operation; and
      transmitting, by the STA, a physical-layer protocol data unit (PPDU) after sending a clear-to-send (CTS) frame responsive to receiving the MU-RTS TXS trigger frame.

6. The method of claim 5, wherein, responsive to the MU-RTS TXS trigger frame containing a user information field that is addressed to the STA, the updating of the one or more parameters of the EDCA parameter set comprises updating the one or more parameters corresponding to one or more access categories (ACs) from which at least one quality of service (QOS) data frame was transmitted successfully by the STA within an allocated time in response to the MU-RTS TXS trigger frame.

7. The method of claim 6, wherein the updating of the one or more parameters of the EDCA parameter set further comprises applying the updated one or more parameters and starting an updated TXS EDCA timer at an end of the acknowledgement.

8. The method of claim 6, wherein the updating of the one or more parameters of the EDCA parameter set further comprises applying the updated one or more parameters and starting an updated TXS EDCA timer at an end of the transmitting of the PPDU when the PPDU does not require an immediate response.

9. The method of claim 6, wherein the updating of the one or more parameters of the EDCA parameter set further comprises applying the updated one or more parameters and starting an updated TXS EDCA timer at an end of a negotiated allocated time.

10. The method of claim 5, further comprising:
indicating, by the STA, a required allocation time responsive to receiving the MU-RTS TXS trigger frame.

11. The method of claim 10, wherein the MU-RTS TXS trigger frame contains a value indicating the allocated time, and wherein the indicating comprises transmitting a clear-to-send (CTS) frame containing a duration field that indicates the required allocation time.

12. The method of claim 11, wherein a value of 0 or a predefined value in the duration field indicates the rejection of the allocated time.

13. The method of claim 10, wherein the indicating comprises indicating, in the PPDU, a required allocation time, and wherein a value of the required allocation time indicates a time no later than an ending time of the PPDU carrying the MU-RTS TXS trigger frame plus the required allocation time in soliciting the MU-RTS TXS trigger frame.

14. The method of claim 13, wherein a value of the required allocation time is carried in a TXOP duration field of a signal A (SIG-A) field of the PPDU or in a duration field of a medium access control (MAC) header of the PPDU.

15. An apparatus, comprising: a transceiver configured to communicate wirelessly; and a processor coupled to the transceiver and configured to perform operations comprising: receiving, via the transceiver, an indication of an enhanced distributed channel access (EDCA) parameter set; updating one or more parameters of the EDCA parameter set with respect to a triggered transmission opportunity (TXOP) sharing (TXS) operation; performing, during a TXS service period (SP), a TXS operation comprising: receiving, via the transceiver, a multi-user (MU) request-to-send (RTS) TXS trigger frame indicating an allocated time for performing the TXS operation; and transmitting, via the transceiver, a physical-layer protocol data unit (PPDU) after sending a clear-to-send (CTS) frame responsive to receiving the MU-RTS TXS trigger frame, wherein the EDCA parameter set comprises a plurality of access category (AC)-related parameter records, wherein each of the plurality of AC-related parameter records comprises a TXS EDCA timer, wherein the STA applies the plurality of parameters for a corresponding AC when the TXS EDCA timer is non-zero, and wherein the an arbitration interframe spacing number (AIFSN) denotes a number of slots after a short interframe space (SIFS) that the STA defers before invoking a backoff procedure or starting a transmission, wherein the updating of the one or more parameters of the EDCA parameter set comprises starting the TXS EDCA timer at an end of an immediate acknowledgement in response to transmission of a frame by the STA or at an end of the transmission of the frame which does not require the immediate acknowledgement by the STA within an allocated time.

16. The apparatus of claim 15, wherein the plurality of access category (AC)-related parameter records comprises:
a TXS AC_BE parameter record pertaining to a best-effort AC;
a TXS AC_BK parameter record pertaining to a background AC;
a TXS AC_VO parameter record pertaining to a voice AC; and
a TXS AC_VI parameter record pertaining to a video AC, wherein each of the plurality of AC-related parameter records further comprises a plurality of parameters comprising:
a minimum contention window (CW) parameter;
a maximum CW parameter; and
an arbitration interframe spacing number (AIFSN).

17. The apparatus of claim 15, wherein, responsive to the MU-RTS TXS trigger frame containing a user information field that is addressed to the STA, in updating the one or more parameters of the EDCA parameter set, the processor is configured to perform operations comprising:
updating the one or more parameters corresponding to one or more access categories (ACs) from which at least one quality of service (QOS) data frame was transmitted successfully by the STA to the AP within an allocated time in response to the MU-RTS TXS trigger frame; and
applying the updated one or more parameters and starting an updated TXS EDCA timer at an end of the acknowledgement, at an end of the transmitting of the PPDU when the PPDU does not require an immediate response, or at an end of a negotiated allocated time.

18. The apparatus of claim 15, wherein the processor is further configured to perform operations comprising:
indicating, via the transceiver, a required allocation time responsive to receiving the MU-RTS TXS trigger frame,
wherein, responsive to the MU-RTS TXS trigger frame containing a value indicating the allocated time, the indicating comprises transmitting a clear-to-send (CTS) frame containing a duration field that indicates the required allocation time such that:
a value of 0 or a predefined value in the duration field indicates the rejection of the allocated time, or
wherein the indicating comprises indicating, in the PPDU, a required allocation time such that a value of the required allocation time indicates a time no later than an ending time of the PPDU carrying the MU-RTS TXS trigger frame plus the required allocation time in soliciting the MU-RTS TXS trigger frame.

* * * * *